(12) United States Patent
Dwyer

(10) Patent No.: US 6,990,612 B2
(45) Date of Patent: Jan. 24, 2006

(54) SYSTEM AND METHOD FOR PREVENTING SOFTWARE ERRORS

(75) Inventor: Lawrence D.K.B. Dwyer, South San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 456 days.

(21) Appl. No.: 10/198,868

(22) Filed: Jul. 18, 2002

(65) Prior Publication Data

US 2004/0015747 A1     Jan. 22, 2004

(51) Int. Cl.
*G06F 11/00*     (2006.01)
(52) U.S. Cl. .......................... 714/47; 714/57; 714/51; 714/52
(58) Field of Classification Search .................. 714/51, 714/52, 57
See application file for complete search history.

(56) References Cited

U.S. PATENT DOCUMENTS 6,122,738 A * 9/2000 Millard ....................... 713/187

6,732,306 B2 * 5/2004 Dover et al. ................. 714/719

* cited by examiner

*Primary Examiner*—Robert Beausoliel
*Assistant Examiner*—Timothy M. Bonura

(57) ABSTRACT

The present invention provides systems and methods for preventing software errors caused by address range or alignment errors. In architecture, a representative system includes a compiler that parses a program and further comprises a logic that generates a verification value for a block of code in the program, a logic that stores the verification value in the block of code, and a logic that inserts verification value instruction code into the block of code. The present invention can also be viewed as a method for preventing software errors in a program. A representative method operates by generating a verification value for a block of code in the program, and storing the verification value in the block of code. During execution of the program, a runtime verification value is generated for the block of code, and the block of code is executed if the verification value equals the runtime verification value, and generates an error message if the verification value does not equals the runtime verification value.

24 Claims, 7 Drawing Sheets

SYSTEM AND METHOD FOR PREVENTING SOFTWARE ERRORS

FIELD OF THE INVENTION

The present disclosure relates to systems and methods for executing computer programs. More particularly, the disclosure relates to systems and methods for preventing software errors that are caused by address range or alignment errors without adding range and alignment information to the run-time-architecture of each procedure call.

BACKGROUND OF THE INVENTION

In general, there are only two forms of a data object in a program, instances and references. An instance is the actual data object, and can be created statically by the compiler or dynamically by the application. A reference occurs when a function accesses a data object whose instance was created elsewhere (usually in another function).

Ordinarily, all programs are comprised of one or more functions. Larger programs may have the sources for many of the functions stored in separate files for convenience of maintenance and to reduce compile time. Since the source for these large programs are stored in separate files, they are compiled into relocatable object files (i.e., "." files) that have one-to-one correspondence with their source file. The compilation of these source files into the relocatable object files has a temporal nature. A relocatable object file derived from one source can be produced one month and a relocatable object file derived from another source file can be produced in another month. A resulting program can then be constructed by linking two relocatable object files at a third time without compromising the correctness of the program. This linking without compromising the correctness of the program is provided on the condition that none of the source files are changed between the compilation of the first source file and the compilation of the second source file.

This utilization of the relocatable object file derived from one source that can be produced in one month and accessed and re-utilized in other modules at a later time normally will not have address range or alignment errors caught by the linker. This is especially true during the development of the multiple code modules, in that the program can then have a high failure rate during execution. Therefore, there is a need for the developers to have the ability to have address range or alignment check performed at run-time to ensure run-time program correctness. This address range or alignment checking is needed because of inconsistent references to objects that change over time.

There is also a great need to make this address range or alignment check temporary, because once the developers have ensured the run-time correctness of the program then the additional overhead caused in space or time to perform this run-time checking need not be performed on an ongoing basis when the program is in normal production or is being utilized by the end user.

There is also the need to have the run-time address range or alignment checking performed on an as needed basis (i.e. switchable) should errors occur during normal operation. This switchable run-time checking would then allow for the debugging of the program modules at a later time by switching the run-time checking to an "on" mode to assist in debugging of the programs. In order to have this switchable, there is a need to allocate the space required for a methodology to perform the run-time address range or alignment checking at any time desired.

However, if one of the relocatable object files is produced from a first source, and a data object declaration in a second source that is used by both of the source files is changed in the common header file, a second relocatable object file is produced from the second source file. Then the two relocatable object files will contain data object declarations that are incompatible, but not detectably different.

From the foregoing, it can be appreciated that it would be desirable to have a system and method for preventing software errors caused by address range or alignment errors.

SUMMARY OF THE INVENTION

The present disclosure relates to system and method for preventing software errors that are caused by address range or alignment errors. Briefly described, in architecture, a preferred embodiment of the system includes a compiler that parses a program. The compiler further comprises a logic that generates a verification value for a block of code in the program, a logic that stores the verification value in the block of code, and a logic that inserts verification value instruction code into the block of code.

The present invention can also be viewed as providing a method for preventing software errors that are caused by address range or alignment errors. In this regard, the preferred method can be broadly summarized by the following steps: (1) generating a verification value for a block of code in the program; (2) storing the verification value in the block of code; (3) computing a runtime verification value for the block of code during execution of the program; (4) executing the block of code if the verification value equals the runtime verification value; and (5) generating an error message if the verification value does not equals the runtime verification value.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 1:
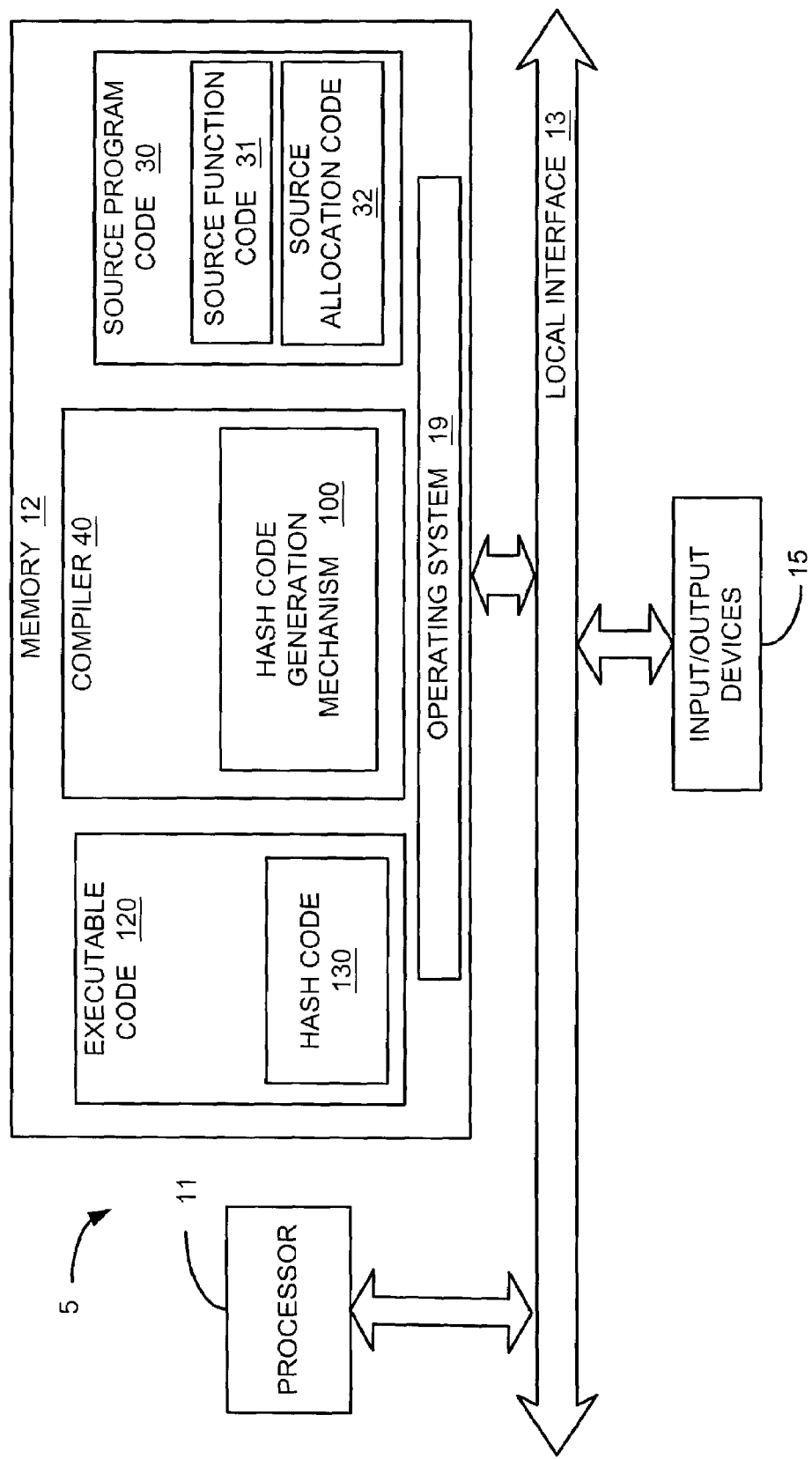
FIG. 1 is a block diagram of a user system showing the compiler with the hash value code generation, source program code and executable code within a memory area.

Referring now in more detail to the drawings, in which like numerals indicate corresponding parts throughout the several views, the present invention will be described. While the invention is described in connection with these drawings, there is no intent to limit it to the embodiment or embodiments disclosed therein. On the contrary, the intent is to cover all alternatives, modifications, and equivalents included within the spirit and scope of the invention as defined by the appended claims.

The present invention relates to systems and methods for preventing software errors caused by address range and alignment errors. The present invention augments the compiler to add information about the instance of an object that uniquely identifies the name, size, type, or order of the elements that make up the object. This information about the instance of an object can be called a verification value, hash value or signature, and will be hereafter referred to as a hash value. This hash value is placed immediately before each object (i.e., in memory and has a lower address than the base address of the object). This is optionally done by the compiler when it allocates the object statically.

As stated previously, the hash value is a generated digital signature for an object. This digital signature can be generated from the object name, object size, object order, or object type for a simple object structure. In addition, for the complex object structure, the order of simple objects within the complex object structure may also be used to compute the verification value, hash value or digital signature. In this regard, it is possible for the verification value, hash value or digital signature to indicate if simple or complex objects within a complex object have been re-ordered from a previously defined layout. In this situation, the size and data range will be consistent, however, the alignment of each of the objects within a complex object may be off considerably from the previously defined object.

When an application creates an object by calling a memory-allocation function (i.e. dynamic), special handling typically is needed because the allocation function is usually typeless. Typeless means it allocates space but it does not know what object will be placed within the space. Through programming conventions, the program developer creates a new allocation function for each type of object that is dynamically created. This function allocates the space for the object and space for the hash value. It initializes the hash value, then returns a pointer to the space allocated for the object. Extensions to the language via pragmas can make this step of the allocation and initialization transparent to the program developer.

References to the object are passed from function to function by passing a "pointer" to the base (i.e. lowest) address of the object. This address is not a pointer to the hash value of the object. The compiler is augmented in at least some embodiments of this invention so that the compiler checks for the presence of the hash value stored in memory immediately before (i.e. lower address) the base address of the object. If the hash value is present, codes inserted in the function by the compiler compares the hash value of the external object against a hash value the compiler has computed for the object when the function was compiled. If the hash values match, the function proceeds. If the hash values do not match, an irrecoverable failure path can be executed.

By computing hash values when objects are created, and computing and comparing hash values when objects are referenced, any change made to the object that happened between compiling one source module and compiling a second source module is detectable by the application at run-time. Typically, compiler type checking only detects errors of code references at the time each module is compiled. It cannot detect errors caused because of changes made to the object declaration between compiles.

The present invention comprises a system and method for preventing software errors caused by address range and alignment errors. This is particularly important when you have multiple programmers developing a system where there are multiple modules created by separate groups of programmers. When this type of system generation is utilized, there is a higher incidence of errors due to miscommunication of object reference definitions. This is particularly important in some computer programs that share object references that are created and modified by different programmers for their particular modules over time. Therefore, the data object is not consistent across all modules. This can create a tremendous problem in that many computer languages during compilation and linking will not catch the address range or alignment errors, and therefore the errors will only occur at run-time. An example of one method to establish whether or not a hash value is generated is the allocation of a flag or unique identifier (e.g., a magic number to indicate that a hash value is available for this object).

Turning now to the drawings, FIG. 1 is a block diagram example of a general-purpose computer that can implement the hash value code generation mechanism of the invention. Generally, in terms of hardware architecture, as shown in FIG. 1, the computer 5 includes a processor 11, memory 12, and one or more input devices and/or output (I/O) devices 15 (or peripherals) that are communicatively coupled via a local interface 13. The local interface 13 can be, for example but not limited to, one or more buses or other wired or wireless connections, as is known in the art. The local interface 13 may have additional elements, which are omitted for simplicity, such as controllers, buffers (caches), drivers, repeaters, and receivers, to enable communications. Further, the local interface 13 may include address, control, and/or data connections to enable appropriate communications among the aforementioned components.

The processor 11 is a hardware device for executing software that can be stored in memory 12. The processor 11 can be virtually any custom made or commercially available processor, a central processing unit (CPU) or an auxiliary processor among several processors associated with the computer 5, and a semiconductor based microprocessor (in the form of a microchip) or a macroprocessor. Examples of suitable commercially available microprocessors are as follows: an 80×86, Pentium or Itanium series microprocessor from Intel Corporation, U.S.A., a PowerPC microprocessor from IBM, U.S.A., a Sparc microprocessor from Sun Microsystems, Inc, a PA-RISC series microprocessor from Hewlett-Packard Company, U.S.A., or a 68xxx series microprocessor from Motorola Corporation, U.S.A.

The memory 12 can include any one or combination of volatile memory elements (e.g., random access memory (RAM, such as DRAM, SRAM, etc.)) and nonvolatile memory elements (e.g., ROM, hard drive, tape, CDROM, etc.). Moreover, the memory 12 may incorporate electronic, magnetic, optical, and/or other types of storage media. Note that the memory 12 can have a distributed architecture, where various components are situated remote from one another, but can be accessed by the processor 11.

The software in memory 12 may include one or more separate programs, each of which comprises an ordered listing of executable instructions for implementing logical functions. In the example of FIG. 1, the software in the memory 12 includes an operating system 19, a source program code 30 that includes source function code 31 and source allocation code 32, the hash value code generation mechanism 100 in the compiler 40, and executable code 120 that includes hash value code 130.

A non-exhaustive list of examples of suitable commercially available operating systems 19 is as follows: a Windows operating system from Microsoft Corporation, U.S.A., a Netware operating system available from Novell, Inc., U.S.A., an operating system available from IBM, Inc., U.S.A., any LINUX operating system available from many vendors or a UNIX operating system, which is available for purchase from many vendors, such as Hewlett-Packard Company, U.S.A., Sun Microsystems, Inc. and AT&T Corporation, U.S.A. The operating system 19 essentially controls the execution of other computer programs, such as the hash value code operation mechanism, and provides scheduling, input-output control, file and data management, memory management, and communication control and related services.

The hash value code generation mechanism 100 and the compiler 40 may be a source program, executable program (object code), script, or any other entity comprising a set of instructions to be performed. When a source program, then the program is usually translated via a compiler, assembler, interpreter, or the like, which may or may not be included within the memory 12, so as to operate properly in connection with the O/S 19. Furthermore, the hash value code generation mechanism 100 and the compiler 40 can be written as (a) an object oriented programming language, which has classes of data and methods, or (b) a procedure programming language, which has routines, subroutines, and/or functions, for example but not limited to, C, C++, Pascal, BASIC, FORTRAN, COBOL, Perl, Java, and Ada.

The I/O devices 15 may include input devices, for example but not limited to, a keyboard, mouse, scanner, microphone, etc. Furthermore, the I/O devices 15 may also include output devices, for example but not limited to, a printer, display, etc. Finally, the I/O devices 15 may further include devices that communicate both inputs and outputs, for instance but not limited to, a modulator/demodulator (modem; for accessing another device, system, or network), a radio frequency (RF) or other transceiver, a telephonic interface, a bridge, a router, etc.

If the computer 5 is a PC, workstation, or the like, the software in the memory 12 may further include a basic input output system (BIOS) (omitted for simplicity). The BIOS is a set of essential software routines that initialize and test hardware at startup, start the O/S 19, and support the transfer of data among the hardware devices. The BIOS is stored in ROM so that the BIOS can be executed when the computer 5 is activated.

When the computer 5 is in operation, the processor 11 is configured to execute software stored within the memory 12, to communicate data to and from the memory 12, and to generally control operations of the computer 5 pursuant to the software. The hash value code generation mechanism 100 in the compiler 40 and the O/S 19 are read, in whole or in part, by the processor 11, perhaps buffered within the processor 11, and then executed.

When the hash value code generation mechanism 100 in the compiler 40 is implemented in software, as is shown in FIG. 1, it should be noted that the mechanism 100 and the compiler 40 can be stored on virtually any computer readable medium for use by or in connection with any computer related system or method. In the context of this document, a computer readable medium is an electronic, magnetic, optical, or other physical device or means that can contain or store a computer program for use by or in connection with a computer related system or method. The hash value code generation mechanism 100 and the compiler 40 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where hash value code generation mechanism 100 and the compiler 40 are implemented in hardware, the hash value code generation mechanism 100 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 2:
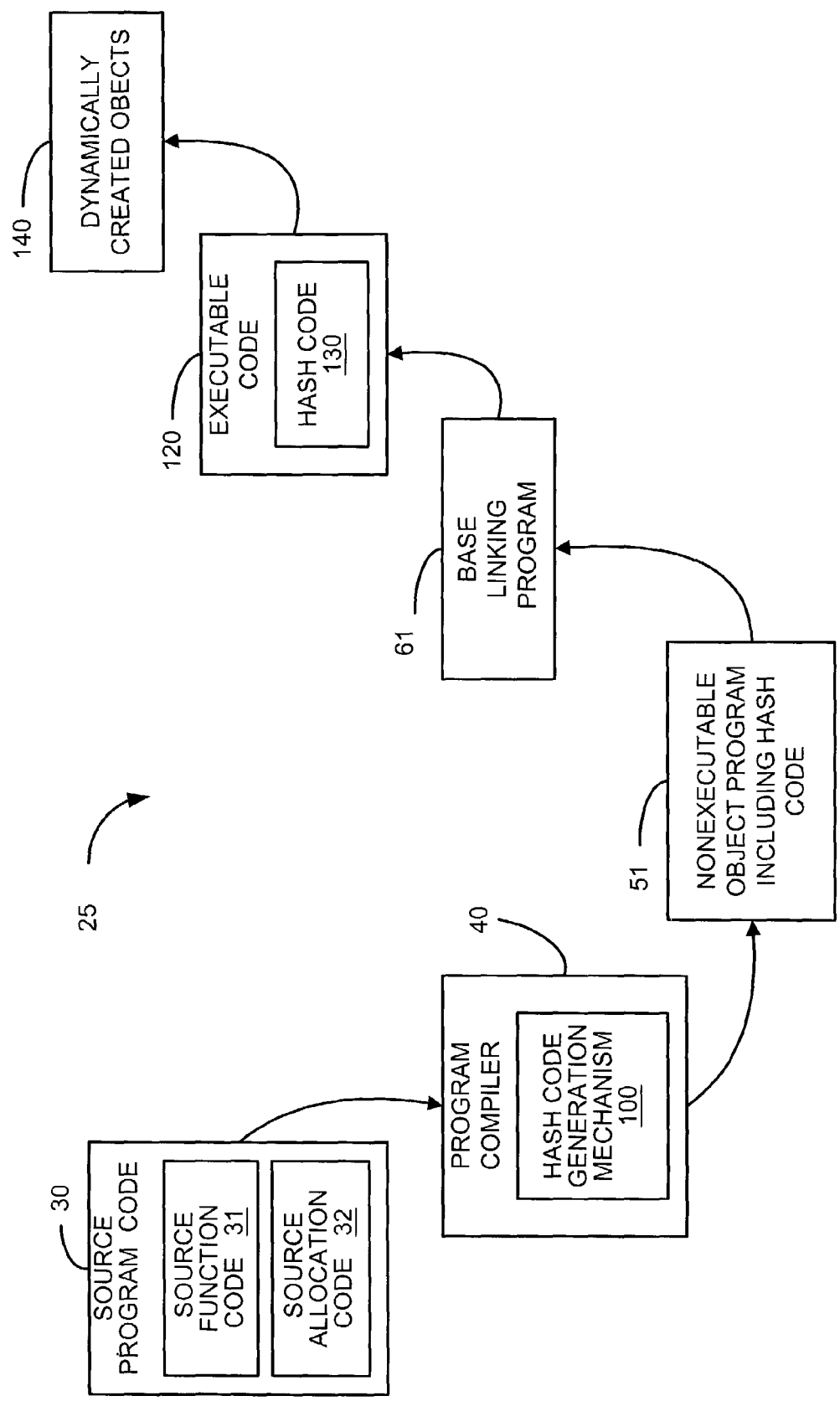
FIG. 2 is a block diagram illustrating an example of the process flow used to create an executable program that includes the hash value mechanism of the present invention.

Illustrated in FIG. 2 is a block diagram illustrating an example of the process to create and execute a program with the hash value code generation mechanism 100. First, the source program code 30 containing the source function code 31 and source allocation code 32 is input into the program compiler 40. The program compiler 40 containing the hash value code generation mechanism 100 generates a nonexecutable object program 51 that includes hash value code. The nonexecutable object program 51, including the hash value code, is then processed by the base linking program 61. The base linking program 61 generates an executable code 120 that includes the hash value code 130. During execution of the executable code 120, including the hash value code 130, objects 140 are created. These objects 140 are utilized in the operation of the executable code 120. Some objects 140 are created with a hash value defined using hash value code 130.

Figure 3:
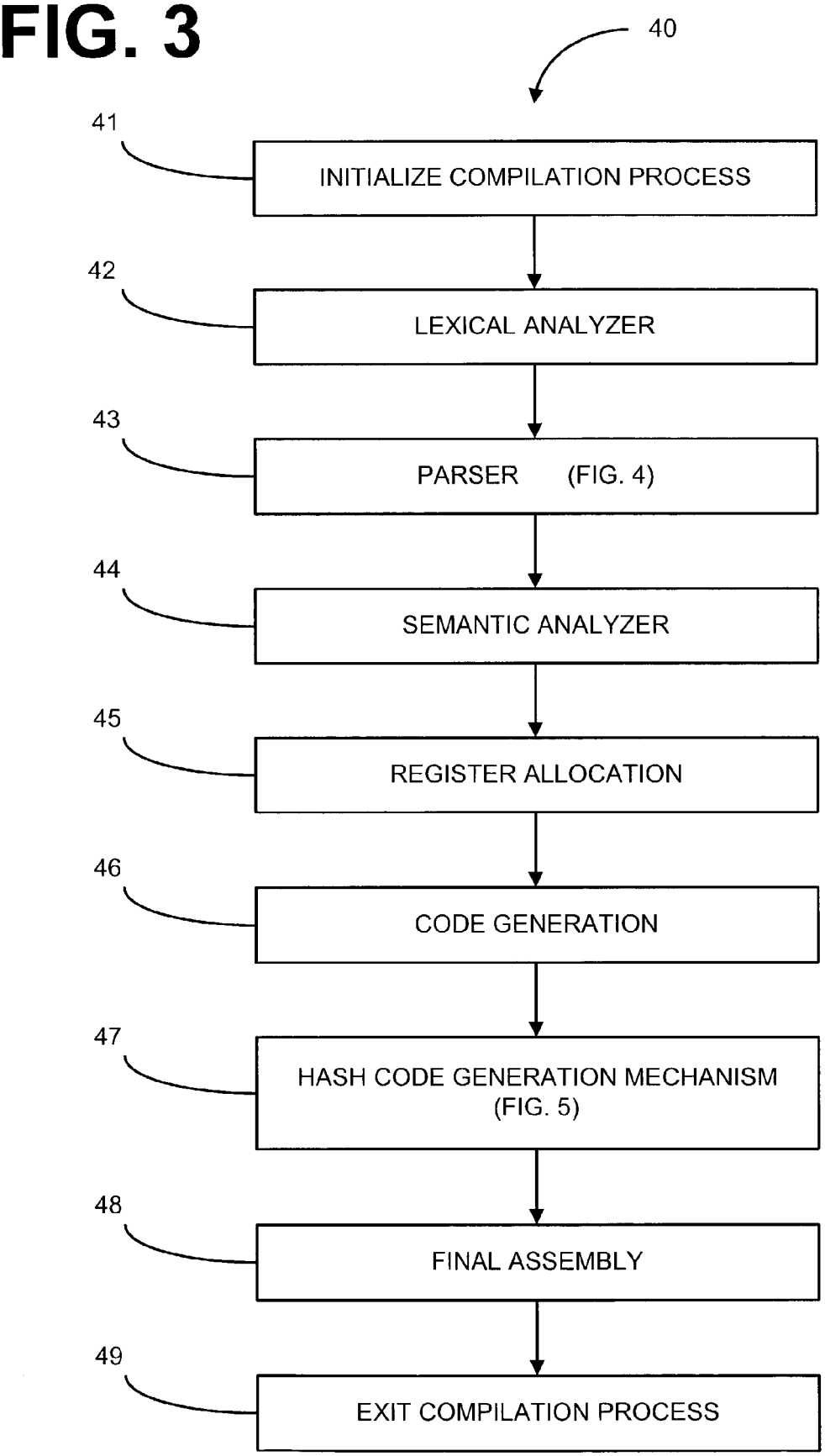
FIG. 3 is a flow chart illustrating functionality of an example of the compilation process utilizing the hash value code generation mechanism of the present invention, as shown in FIG. 1.

Illustrated in FIG. 3 is a flow chart depicting functionality of an example of the compilation process 40, including the hash value code generation mechanism 100 of the present invention. First, the compilation process 40 is initialized at step 41. At step 42, a lexical analyzer is performed on source code 30 (FIG. 2). At step 43, a parser is executed. The parser functionality is herein described in further detail with regard to FIG. 4.

At step 44, the semantic analyzer is operated and the register allocation is performed at step 45. At step 46, the code generation process is executed. The code generation process generates the nonexecutable object program 45. At step 47, the compilation process 40 then executes the hash value code generation mechanism that inserts hash value code into the nonexecutable object program 45. The hash value code generation mechanism is herein described in further detail with regard to FIG. 5.

Next, the final assembly of the nonexecutable object program 51 is performed (step 48). This final assembly of the nonexecutable object program includes the hash value code generated at step 47. At step 49, the compilation process 40 then exits.

Figure 4:
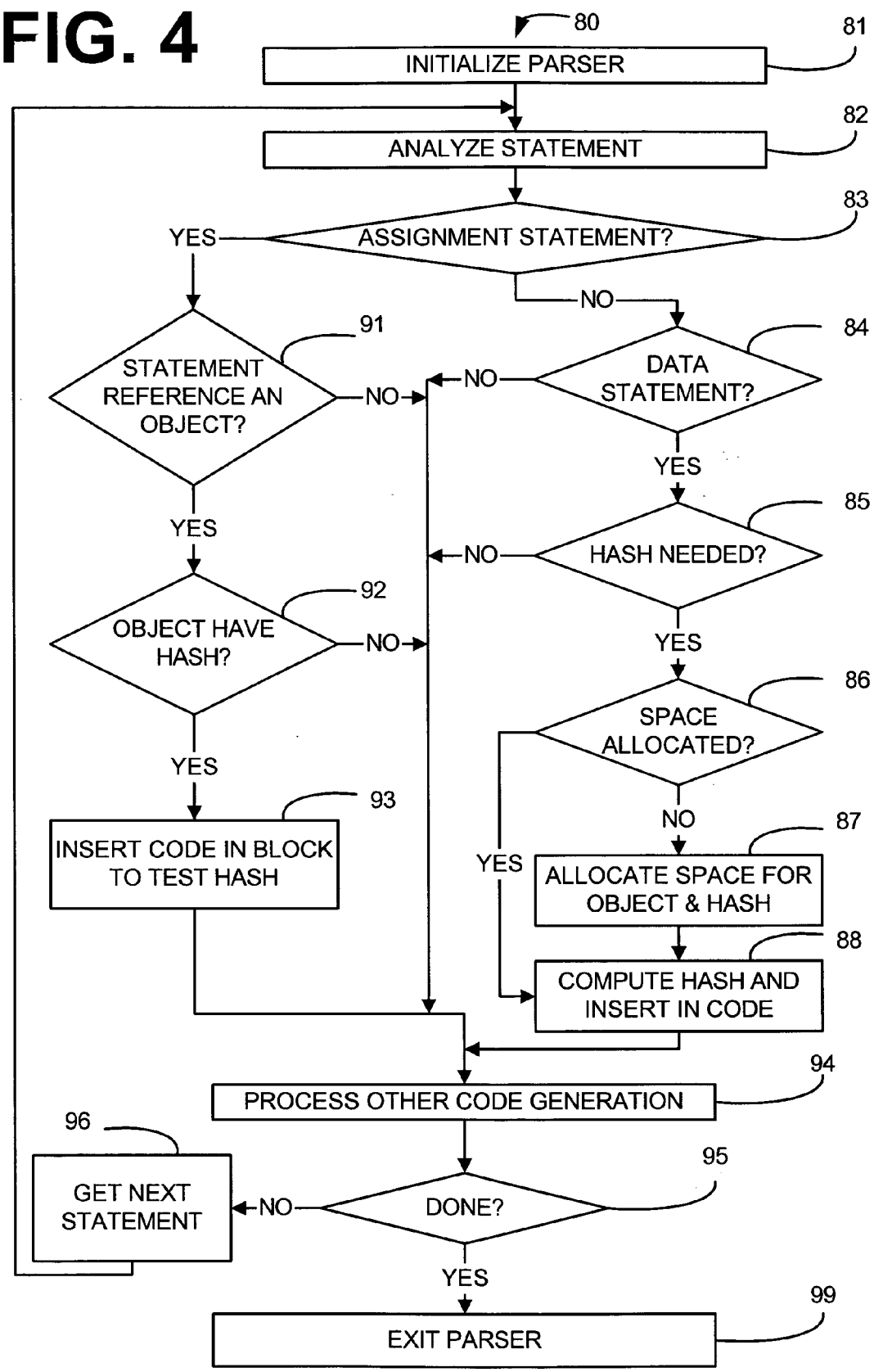
FIG. 4 is a flow chart illustrating preferred functionality of an example of the parser utilized by the compilation process, as shown in FIG. 3.

Illustrated in FIG. 4 is a flow chart illustrating functionality of an example of the parser 80 that is within the compiler 40 that utilizes the hash value code generation mechanism 100 of the present invention. The parser 80 parses each of the statements within the source code 30 and allocates space for objects and hash values generated then and inserts code into a block to test the hash value if it is indicated that a hash value is to be generated for a particular object.

First, the parser is initialized and gets the first data statement at step 81. At step 82, the parser 80 then analyzes the code statement. At step 83, the parser 80 then determines whether the statement is an assignment statement.

If at step 83, the parser 80 determines that the statement analyzed is not an assignment statement, then the parser 80 determines whether the statement analyzed (step 82) is a data statement at step 84. If it is determined at step 84 that the analyzed statement is not a data statement, then the parser 80 proceeds to step 94. However, if it is determined at step 84 that the statement analyzed at step 82 is a data statement, then the parser 80 checks whether a hash value generation is needed at step 85.

The indication by the programmer that a hash value needs to be generated for this data statement is generally performed in pre-described manners defined by the particular program language used for the identified program code. For example, when utilizing the C program language for program generation, the developer, i.e., the programmer, can utilize pragma statements or predetermined configured flags to indicate to the compiler whether or not a hash value is to be generated for this particular data statement. It is contemplated by the inventor that hash value generation can be turned on for some data statements in the program and turned off for others therefore specifically targeting which data statements require the hash value generation. This enables the programmer to have complete control over what data statements are tested. This enables the developer to identify which data statements are more at risk for run-time errors due to invalid type referencing. It is also contemplated by the inventor that this form of specified or focused type checking can be utilized in the assembler by assembly programs using end line assembler directives.

If it is determined at step 85 that a hash value is not needed, then the parser 80 then proceeds to step 94. However, if it is determined at step 85 that the data statement does need a hash value, then the parser 80 determines whether space is allocated for the generated hash value at step 86. If it is determined at step 86 that the space is allocated, then the parser 80 proceeds to step 88. However, if it is determined at step 86 that the space for the needed hash value is not allocated, then the parser 80 allocates the space for the object and hash value at step 87.

At step 88, the parser 80 then computes the hash value and inserts the hash value code into the code block and then proceeds to step 94. As stated previously, this hash value or digital signature is computed on at least one of a variety of different elements within the object. The elements include the object name, the object size, the order of objects within the current object just to name a few elements. However, the inventors realize that a number of different elements within the object can be used to compute a unique hash value that indicates the structure of the current object.

However, if it is determined at step 83 that the statement parsed is an assignment statement, the parser 80 then proceeds to step 91. At step 91, the parser 80 determines whether the statement references an external object. If it is determined at step 91 that the statement does not reference an external object, then the parser 80 proceeds to step 94 to process other code generation. However, if it is determined at step 91 that the statement referenced is an external object, the parser 80 then determines whether the external object has a hash value at step 92. If it is determined at step 92 that the object is not to have a hash value, the parser 80 then proceeds to step 94 to process other code generation. However, if it is determined at step 92 that the object has a hash value, then the parser 80 inserts the code in the code block to test the generated hash value, at step 93.

At step 94, the parser then processes other code generation as known in the art, and then determines if there are more statements to be processed (step 95). If there are more statements to be processed, then the parser 80 gets the next statement at step 96 and returns to repeat steps 82–95. However, if it is determined at step 95 that there are no more statements to be processed, then the parser 80 exits at step 99.

Figure 5:
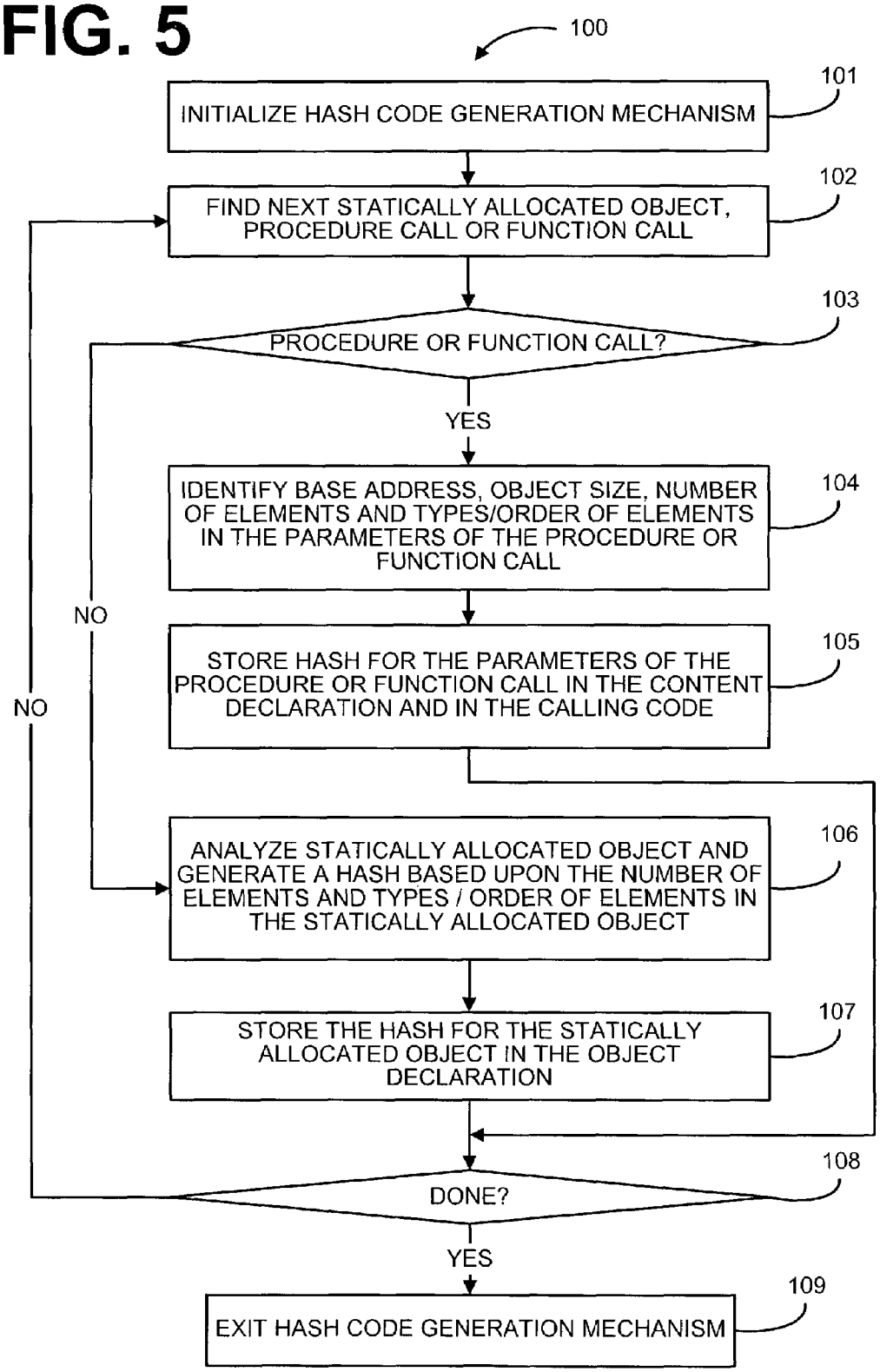
FIG. 5 is a flow chart illustrating preferred functionality of the hash value code generation process of the present invention, as shown in FIGS. 1, 2 and 3.

Illustrated in FIG. 5 is a flow chart depicting functionality of an example of the check code generation mechanism 100 of the present invention that is utilized by the compiler 40 (FIG. 3). First, the hash value code generation mechanism 100 is initialized at step 101. At step 102, the hash value code generation mechanism 100 then finds the first or next statically allocated object procedure call or function call.

At step 103, the hash value code generation mechanism 100 determines whether the next allocated object procedure call or function call is indeed a procedure or function call. If it is determined at step 103 that the next statically allocated block is a procedure or function call, then the hash value code generation mechanism 100 then identifies the base address, object size, number of elements, and type and order of elements in the procedure or function call, at step 104. At step 105, the hash value is stored for the procedure or function call in the content declaration for the procedure or function call. The hash value for the procedure or function call is also stored in the function or procedure calling code. Next, the hash value code generation mechanism 100 proceeds to step 108 to see whether there are more hash values to be generated.

However, if it is determined at step 103 that the next statically allocated object procedure call or function call is not a procedure or function call, then the hash value code generation mechanism 100 analyzes the statically allocated object and generates a hash value based upon the number of elements and type and order of elements in the statically allocated object, at step 106. At step 107, the hash value is stored for the statically allocated object in the object declaration.

At step 108, the hash value code generation mechanism determines whether there is more hash value code to be generated for statically allocated object, procedure or function calls. If it is determined at step 108 that there are more statically allocated object, procedure or function calls, then the hash value code generation mechanism 100 returns to repeat steps 102 through 108. However, if it is determined at step 108 that there are no more statically allocated object, procedure or function calls for hash values to be generated, then the hash value code generation mechanism 100 exits at step 109.

Figure 6:
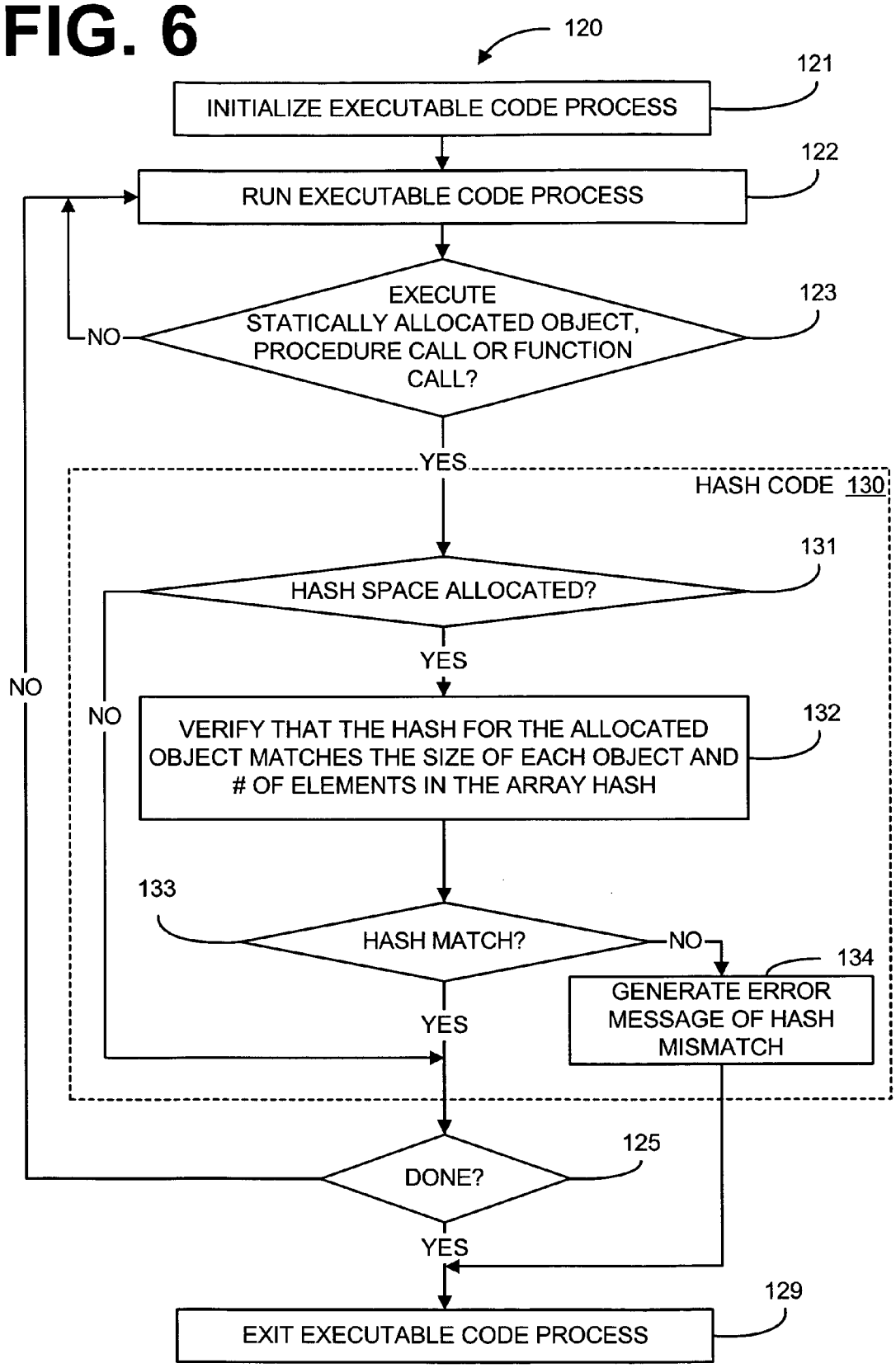
FIG. 6 is a flow chart illustrating preferred functionality of an example of the executable code process that operates the hash value code generated by the hash value code generation process, as shown in FIG. 5.

Illustrated in FIG. 6 is a flow chart depicting functionality of an example of the executable code process 120 that includes the hash value code 130 generated by the hash value code generation mechanism 100 of the present invention. First, the executable code process 120 is initialized at step 121. At step 122, the executable code process is run. At step 123, the executable code process 120 determines whether the executed statement is a statically allocated object, procedure or function call. If it is determined at step 123 that the next statement is not a statically allocated object, procedure or function call, then the executable code process 120 returns to repeat steps 122 and 123.

However, if it is determined at step 123 that the next code executed is a statically allocated object, procedure or function call, then at step 131, the executable code process 120 runs the hash value code 130 that determines whether there is hash value space allocated for the statically allocated object, procedure or function call. If it is determined at step 131 that there is hash value space allocated for the statically allocated object, procedure or function call, then the hash value code 130 verifies the hash value in the statically allocated object, procedure or function call to make sure that it matches the size of each object and the number of elements in the array for the generated hash value at step 132. The hash value code 130 then proceeds to identify whether the hash value in the statically allocated object, procedure or function call matches the hash value in the array at step 133. At step 133, the hash value code 130 determines whether the hash values match. If it is determined at step 133 that the hash values do not match, then the hash value code 130 generates an error message of hash value mismatch at step 133 and then exits at step 129. However, if the hash value code 130 determines at step 133 that the hash values do match, then the executable code process 120 resumes processing.

The executable code process 120 then determines whether it is done processing code statements at step 125. If it is determined at step 125 that there are more code statements to be processed, then the executable code process 120 returns to repeat steps 122 through 125. However, if it is determined at step 125 that there is no more executable code to be run, then the executable code process 120 exits at step 129.

Figure 7:
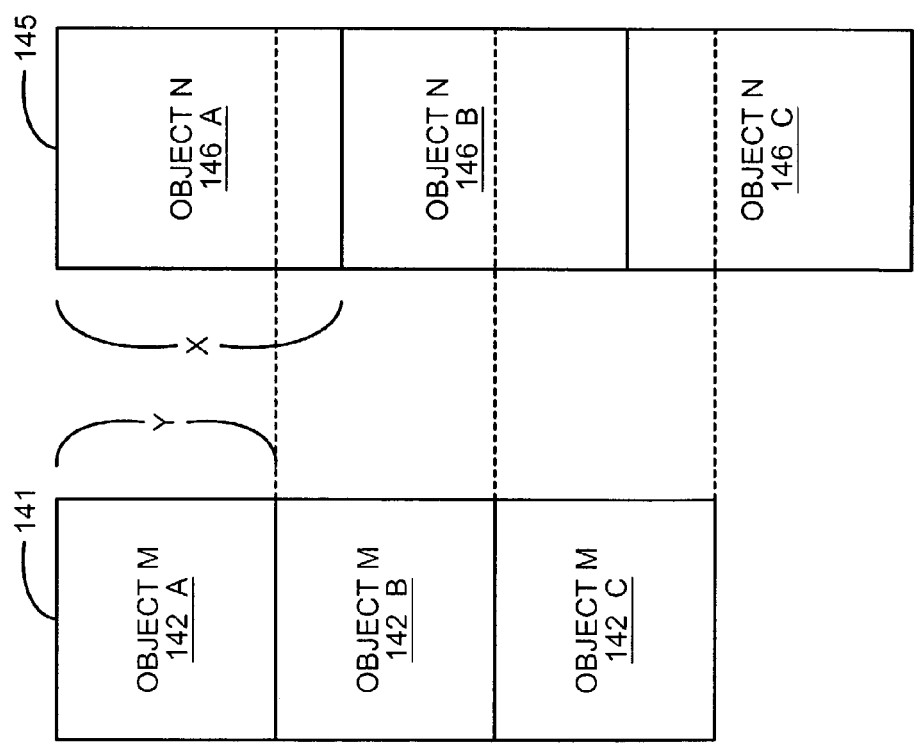
FIG. 7 is a block diagram illustrating an example of an address range and alignment error to be detected by the present invention.

Illustrated in FIG. 7 is a block diagram illustrating an example of an address range and alignment error to be detected by the present invention. As shown, object 141 contains objects 142A, B and C and object 145 contains objects 146A, B and C. As shown, object 142A is of size and range Y where object N 146A is of size X where X does not equal Y. This is to illustrate that if a first program is compiled with a definition of object 141 to contain objects 142A through 142C of a particular size and a second program refers to objects 145 consisting of objects 146A through 146C and that these are to be identical objects then it can be seen that references to object 145 which is defined as object 141 would cause a range and alignment error.

Figure 8A:
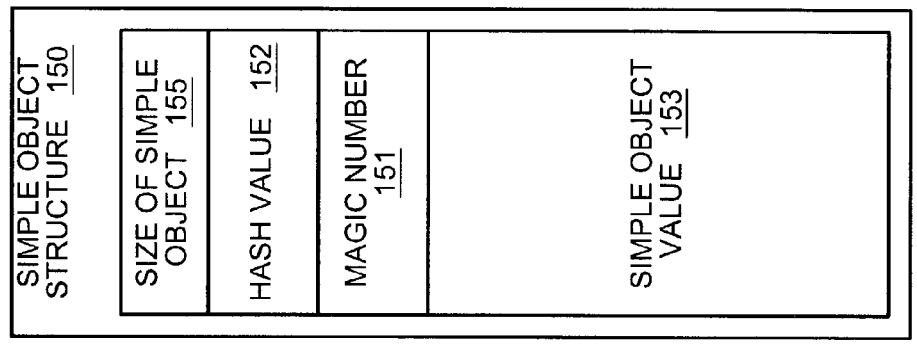
FIG. 8A is a block diagram illustrating an example of a simple object structure with the generated hash value generated by the hash value code generation process of the present invention, as shown in FIGS. 1–3 and 4.

Illustrated in FIG. 8A is a block diagram illustrating an example of a simple object structure 150 with the generated hash value 152 generated by the hash value code generation process of the present invention, as shown in FIGS. 1–3 and 4. As illustrated, the simple object structure 150 comprises a simple object value 153. In addition, with implementation of the hash value code generation process of the present invention, at least the hash value 152 is included with the definition of the simple object value 153. In addition, FIG. 8A also illustrates a magic number 151 to indicate the operation of the hash value for verification of address range and alignment in addition to the size of the simple object 155. These fields, in addition to the simple object value 153 construct the simple object structure 150 of the present invention.

Figure 8B:
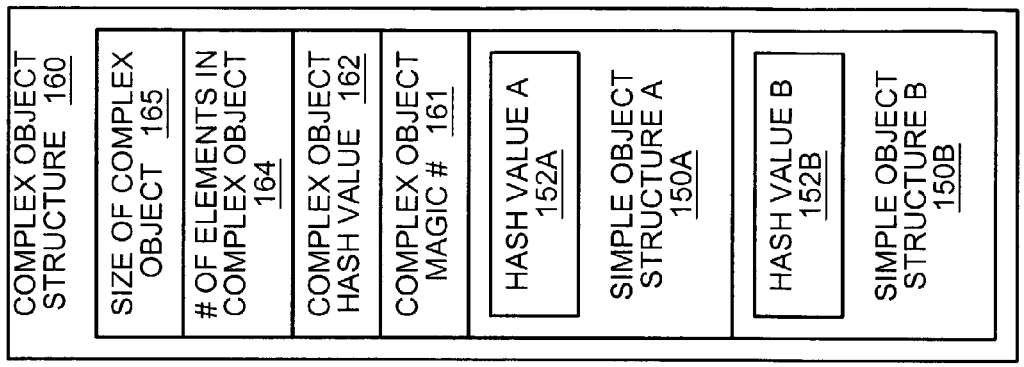
FIG. 8B is a block diagram illustrating an example of a complex object structure with the generated hash value generated by the hash value code generation process of the present invention, as shown in FIGS. 1–3 and 4.

Illustrated in FIG. 8B is a block diagram illustrating an example of a complex object structure 160 with the generated hash value 162 generated by the hash value code generation process of the present invention, as shown in FIGS. 1–3 and 4. As shown, a complex object structure 160 can comprise many different simple object structures 150 or other complex object structures 160 within the structure. The complex object structure 160 comprises at least two or more simple object structures 150 and in most cases comprises, as in the definition of an array, numerous simple object structures 150.

As shown in FIG. 8B, the illustrated example complex object structure 160 contains simple object structure A150A and simple object structure B 150B, as each one of the simple object structures 150 are previously defined with regard to FIG. 8A and each contain their own hash value 152A and 152B. The complex object structure 160 then utilizes these hash values from the simple object structure 150A and 150B to generate a complex object hash value 162. This complex object hash value 162 can indicate the object name, object size and object type and order of any of the simple or complex object structures within it. The complex object structure 160 also may contain the complex object magic number 161 to indicate whether or not the hash value capability is available for the current complex object structure 160. It is also contemplated by the inventor that the complex object magic number 161 can indicate whether or not the capability is currently switched on for utilization of the complex object hash value 162. In addition, it is contemplated by the inventors that the complex object structure 160 can contain indicators of the size of the complex object 165 in addition to the indicator of the number of elements in the complex object 164. Utilization of these indicators can further insure address range and alignment errors are detected at run-time.

While particular embodiments of the invention have been disclosed in detail in the foregoing description and drawings for purposes of example, it will be understood by those skilled in the art that variations and modifications thereof can be made without departing from the scope of the invention as set forth in the following claims.

What is claimed is:

1. A method for preventing software errors in a program, said method comprising steps of:
   generating a verification value for a block of code in the program, the block of code corresponding to one of a statically allocated object, a procedure call and a function call;
   storing the verification value in the block of code;
   computing a runtime verification value for the block of code during execution of the program;
   executing the block of code if the verification value equals the runtime verification value; and
   generating an error message if the verification value does not equal the runtime verification value.

2. The method of claim 1, wherein the generating a verification value step further comprises:
   allocating area for the generated verification value.

3. The method of claim 1, wherein the generating a verification value step further comprises:
   inserting the verification value in the block of code.

4. The method of claim 1, further comprising the step of:
   inserting verification value instruction code into the block of code.

5. The method of claim 1, wherein the generating a verification value step further comprises:
   using a parameter to generate the verification value, wherein the parameter is selected from the group consisting of a base address of the block of code, number of elements in the block of code, type of the elements in the block of code, and order of the elements in the block of code.

6. The method of claim 1, wherein the verification value is a hash value.

7. The method of claim 1, wherein the steps of generating a verification value, storing, computing, executing and generating an error message are performed for each block of code corresponding to a statically allocated object, a procedure call or a function call.

8. A system for preventing software errors in a program, comprising:
   means for generating a verification value for a block of code in the program, the block of code corresponding to one of a statically allocated object, a procedure call and a function call;
   means for storing the verification value in the block of code; and
   means for computing a runtime verification value for the block of code during execution of the program, wherein the computing means executes the block of code if the verification value equals the runtime verification value, and generates an error message if the verification value does not equal the runtime verification value.

9. The system of claim 8, wherein the generating means further comprises:
   means for allocating area for the generated verification value.

10. The system of claim 8, wherein the generating means further comprises:
    means for inserting the verification value in the block of code.

11. The system of claim 8, wherein the generating means further comprises:
    means for inserting verification value instruction code into the block of code.

12. The system of claim 8, wherein the verification value is generated using a parameter, wherein the parameter is selected from the group consisting of a base address of the block of code, number of elements in the block of code, type of the elements in the block of code, and order of the elements in the block of code.

13. The system of claim 8, wherein the verification value is a hash value.

14. A computer readable medium stored on a computer readable memory and executing on a computer for preventing software errors in a program, comprising:
    logic for generating a verification value for a block of code in the program, the block of code corresponding to one of a statically allocated object, a procedure call and a function call;
    logic for storing the verification value in the block of code; and
    logic for computing a runtime verification value for the block of code during execution of the program, wherein the computing logic executes the block of code if the verification value equals the runtime verification value, and generates an error message if the verification value does not equal the runtime verification value.

15. The computer readable medium of claim 14, wherein said logic for generating a verification value further comprises:
    logic for allocating area for the verification value.

16. The computer readable medium of claim 14, wherein said logic for generating a verification value further comprises:
    logic for inserting the verification value in the block of code.

17. The computer readable medium of claim 14, wherein said logic for generating a verification value further comprises:
    logic for inserting verification value instruction code into the block of code.

18. The computer readable medium of claim 14, wherein the verification value is generated using a parameter, wherein the parameter is selected from the group consisting of a base address of the block of code, number of elements in the block of code, type of the elements in the block of code, and order of the elements in the block of code.

19. The computer readable medium of claim 14, wherein the verification value is a hash value.

20. A system with computer readable medium stored on a computer readable memory and executing on a computer for preventing software errors in a program, comprising:
    a compiler that parses a program, wherein the compiler further comprises:
    logic that generates a verification value for a block of code in the program, the block of code corresponding to one of a statically allocated object, a procedure call and a function call;
    logic that stores the verification value in the block of code; and
    logic that inserts verification value instruction code into the block of code.

21. The system of claim 20, wherein the compiler further comprises:
    logic that allocates area in the block of code for the verification value.

22. The system of claim 20, wherein the compiler further comprises:
   logic that for inserts the verification value in the block of code.

23. The system of claim 20, wherein the verification value is generated using a parameter, wherein the parameter is selected from the group consisting of a base address of the block of code, number of elements in the block of code, type of the elements in the block of code, and order of the elements in the block of code.

24. The system of claim 20, wherein the verification value is a hash value.

* * * * *